(12) United States Patent
Kumph

(10) Patent No.: US 8,426,809 B2
(45) Date of Patent: Apr. 23, 2013

(54) APPARATUS AND METHOD FOR TRAPPING CHARGED PARTICLES AND PERFORMING CONTROLLED INTERACTIONS BETWEEN THEM

(75) Inventor: Muir Kumph, Innsbruck (AT)

(73) Assignee: Universität Innsbruck, Innsbruck (AT)

( * ) Notice: Subject to any disclaimer, the term of this patent is extended or adjusted under 35 U.S.C. 154(b) by 167 days.

(21) Appl. No.: 13/107,714

(22) Filed: May 13, 2011

(65) Prior Publication Data

US 2011/0290995 A1 Dec. 1, 2011

(30) Foreign Application Priority Data

May 27, 2010 (EP) .................................... 10164101

(51) Int. Cl.
*B01D 59/44* (2006.01)
*H01J 49/00* (2006.01)

(52) U.S. Cl.
USPC ........... 250/283; 250/281; 250/282; 250/286; 250/287; 250/288; 250/289; 250/290; 250/291; 250/292; 250/396 R

(58) Field of Classification Search .......... 250/281–283, 250/286–292, 396 R
See application file for complete search history.

(56) References Cited

U.S. PATENT DOCUMENTS

| | | | |
|---|---|---|---|
| 7,180,078 B2 * | 2/2007 | Pau et al. ................... | 250/396 R |
| 7,217,922 B2 * | 5/2007 | Jachowski et al. ............ | 250/292 |
| 7,928,375 B1 * | 4/2011 | Mangan et al. ............... | 250/292 |
| 2006/0219888 A1 | 10/2006 | Jachowski et al. | |

FOREIGN PATENT DOCUMENTS

WO  WO-2005114705 A2  12/2005

OTHER PUBLICATIONS

C. Ospelkaus, et al., Trapped-Ion Quantum Logic Gates Based on Oscillating Magnetic Fields, Physical Review Letters, 101, 090502, pp. 1-4 (2008); XP-002595851.
Extended European Search Report, EP 10164101.7, Sep. 6, 2010.
J. Chiaverini, et al., Surface-Electrode Architecture for Ion-Trap Quantum Information Processing, Quantum Information and Computation, vol. 5, No. 6 (2005) pp. 419-439; XP-002595852.

* cited by examiner

Primary Examiner — Jack Berman
Assistant Examiner — Meenakshi Sahu
(74) Attorney, Agent, or Firm — Patterson & Sheridan, LLP

(57) ABSTRACT

An apparatus and a method for trapping charged particles and performing controlled interactions between them are provided. The apparatus includes a substrate and RF electrodes and dedicated DC electrodes arranged on the substrate and configured to generate a trapping potential for trapping the charged particles above the substrate. The RF and dedicated DC electrodes include at least one RF trapping electrode configured to be driven with an RF voltage for contributing to the trapping potential, an array of two or more trapping site DC electrodes configured to be biased with a DC voltage for contributing to the trapping potential, and a first individually drivable RF control electrode arranged between a first pair out of the two or more trapping site DC electrodes. The first RF control electrode is configured to be individually driven by an adjustable RF voltage such that the trapping potential above and between the first pair of trapping site DC electrodes forms separate charged particle traps adapted for trapping charged particles therein if the adjustable RF voltage takes a first value, and forms a charged particle interaction trap adapted for performing controlled interactions between charged particles if the adjustable RF voltage takes a second value.

20 Claims, 6 Drawing Sheets

APPARATUS AND METHOD FOR TRAPPING CHARGED PARTICLES AND PERFORMING CONTROLLED INTERACTIONS BETWEEN THEM

FIELD

The present disclosure relates to an apparatus for trapping charged particles. Moreover, it relates to an apparatus for performing controlled interactions between charged particles. Specifically, an apparatus for trapping charged particles and for performing controlled interactions between the charged particles is described. More specifically, the charged particles may be ions and the apparatus may be an on-chip surface-electrode ion trap apparatus according to some embodiments, typically for performing controlled quantum interactions between the ions. The present disclosure also relates to a method for trapping charged particles and for performing controlled interactions between the charged particles.

BACKGROUND

Ions traps are known in which ionized particles can be stored. Such ion traps can be used as mass spectrometers. By varying the trapping potentials, ions can not only be stored, but also be separated in dependence of their charge-to-mass ratio, wherein ions of a specific charge-to-mass-ratio are ejected from the trap when a certain voltage is applied. The ejected particles can be detected, and mass spectrometry is performed in this way.

The U.S. Pat. No. 7,217,922 B2 describes a planar micro-miniature ion trap device that may be used for this purpose. The planar micro-miniature ion trap device includes a substrate, a first planar annular electrode, and a second planar annular electrode, both rigidly affixed to the substrate surface, wherein the second planar annular electrode is concentric with the first annular electrode. Ions injected into the device can be trapped above the center region of the first annular electrode and be selectively ejected by applying specific voltages to the first annular electrode.

While this ion trap allows trapping of the ions, no controlled manipulation of individual ions is realized.

The U.S. Pat. No. 7,180,078 B2 describes a linear ion trap occupying a rectangular area over the surface of a semiconductor substrate. Arranged along the axis of the ion trap are two rectangular outer DC electrodes, axially segmented, rectangular central DC electrodes, and two rectangular radio-frequency (RF) electrodes between the outer and the central DC electrodes. By applying specific DC voltages to the axial segments of the central DC electrode the position of ions in the ion trap can be controlled.

The ion trap of U.S. Pat. No. 7,180,078 B2 enables a certain manipulation of ions, but only to the extent of controlling their positions by means of DC voltages applied to the segmented DC electrodes above which the ions are trapped.

However, controlled interactions between individual ions or groups of ions may not be realized. Controlled interactions offer the possibility to let ions interact in a desired way for a desired period of time and to substantially prevent interactions between the ions in during other time periods. Such controlled interactions can be important for quantum computation or the simulation of quantum systems.

Quantum computation can offer considerable advantages over classical computation. For instance, there are known quantum algorithms which, when executed on a quantum computer, can break the public key security system employed in many of today's cryptographic systems such as bank transaction systems. This task is believed not to be feasible for a classical, Bit-based computer. Similarly, a classical computer cannot simulate complex quantum systems exactly since the computational power needed for the simulation scales exponentially with the size of the quantum system. Simulation of quantum systems by other, controlled quantum systems is feasible on the other hand. A better understanding of quantum systems is important in many technological areas, in particular in technological fields where devices are of very small size and quantum effects cannot be neglected.

Prior art ion traps typically suffer from either being well isolated traps with a deep trapping potential, where ions cannot interact, or being coupled traps allowing interactions but having a shallow trapping potential that may not securely hold the ions.

Consequently, there is a need for improved apparatuses and methods for trapping charged particles such as ions, and for performing controlled interactions between these charged particles.

SUMMARY

In light of the above, according to one aspect, an apparatus for trapping charged particles and performing controlled interactions between them is provided. The apparatus includes a substrate and RF electrodes and dedicated DC electrodes arranged on the substrate and configured to generate a trapping potential for trapping the charged particles above the substrate. The RF and dedicated DC electrodes include at least one RF trapping electrode configured to be driven with an RF voltage for contributing to the trapping potential, an array of two or more trapping site DC electrodes configured to be biased with a DC voltage for contributing to the trapping potential, and a first individually drivable RF control electrode (250, 251, 252, 253) arranged between a first pair out of the two or more trapping site DC electrodes. The first RF control electrode is configured to be individually driven by an adjustable RF voltage such that the trapping potential above and between the first pair of trapping site DC electrodes forms separate charged particle traps adapted for trapping charged particles therein if the adjustable RF voltage takes a first value, and forms a charged particle interaction trap adapted for performing controlled interactions between charged particles if the adjustable RF voltage takes a second value.

According to another aspect, a method for trapping charged particles and performing controlled interactions between them is provided. The method includes providing RF electrodes and dedicated DC electrodes arranged on a substrate. The RF electrodes and dedicated DC electrodes include at least one RF trapping electrode, an array of two or more trapping site DC electrodes, and a first individually drivable RF control electrode arranged between a first pair out of the two or more trapping site DC electrodes. The method includes applying DC voltages to the dedicated DC electrodes and RF voltages to the RF electrodes to generate a trapping potential for trapping the charged particles above the substrate. The method further includes adjusting the RF voltage of the first individually drivable RF control electrode in order to take a first value such that the electric potential above and between the first pair of trapping site DC electrodes forms separate charged particle traps, and trapping two charged particles therein, and adjusting the RF voltage of the first individually drivable RF control electrode in order to take a second value such that the electric potential above and between the first pair of trapping site DC electrodes forms a charged particle interaction trap, and performing controlled interactions between the two charged particles.

Embodiments are also directed to methods for manufacturing and operating the disclosed apparatus. These method steps may be performed manually or automated, e.g. controlled by a computer programmed by appropriate software, by any combination of the two or in any other manner.

Further advantages, features, aspects and details that can be combined with embodiments described herein are evident from the dependent claims, the description and the drawings.

BRIEF DESCRIPTION OF THE DRAWINGS

A full and enabling disclosure to one of ordinary skill in the art is set forth more particularly in the remainder of the specification including reference to the accompanying drawings wherein.

DETAILED DESCRIPTION

Figure 1:
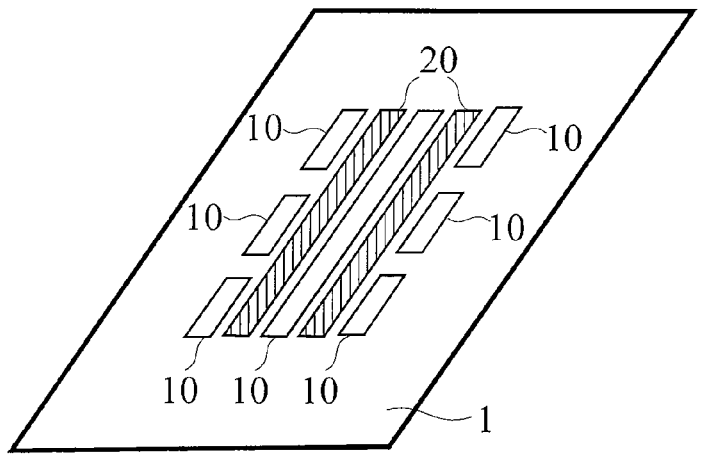
FIG. 1 shows a known linear ion trap.

Reference will now be made in detail to the various exemplary embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Within the following description of the drawings, the same reference numbers refer to the same components. Generally, only the differences with respect to the individual embodiments are described. The structures shown in the drawings are not necessarily depicted true to scale but rather serve the better understanding of the embodiments.

FIG. 1 shows a known planar, linear ion trap. The ion trap includes DC electrodes 10 and radio-frequency (RF) electrodes 20 arranged on a quartz or alumina substrate 1. The outer DC electrodes are segmented while the central DC electrode is not. The RF fields applied to the RF electrodes 20 can confine ions in the vertical direction (direction perpendicular to the plane of the substrate) and in the lateral direction (direction in the plane of the substrate and perpendicular to the trap axis defined by the central DC electrode). The ions are trapped at an RF-null of the generated RF fields that extends along the trap axis above the central DC electrode. The static or quasistatic fields generated by the DC voltages applied to the segmented DC electrodes can confine the ions with respect to the trap axis. Thereby, a linear ion trap is realized. The DC and RF electrodes are typically connected to DC and RF voltage drives via leads that run along the surface of the substrate on which the electrodes are arranged. The leads and drives are not shown in FIG. 1.

An ion trap of this kind is, e.g., described in PRL 96, 253003 (2006). According to the authors of this article, the trap well depth for the surface-electrode trap is fairly shallow. In U.S. Pat. No. 7,180,078 B2, it is proposed to segment the central DC electrode in order to provide enhanced positional control over the ions. To this end, DC control voltages are applied to the respective segments.

Figure 2:
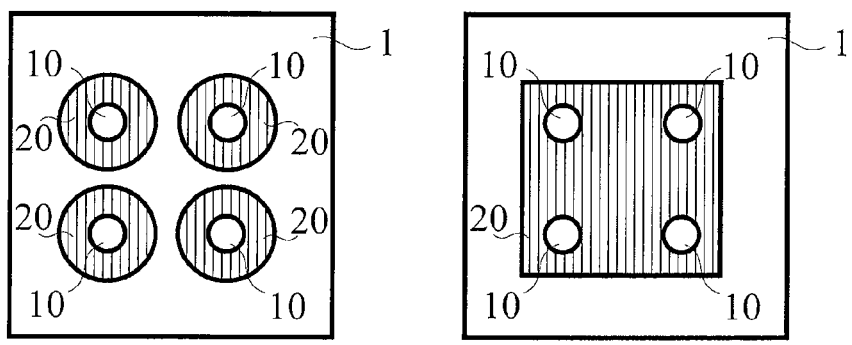
FIG. 2 shows a known 2-dimensional array of separate RF ring traps for ions.

FIG. 2 shows two variants of a two-dimensional array of surface-electrode microtraps. The microtraps are arranged on a substrate 1 and include DC electrodes 10 and RF electrodes 20. The DC electrodes 10 are either surrounded by individual RF electrodes 20 (shown on the left) or by a common RF electrode 20 (shown on the right). The DC and RF voltages applied to the DC and RF electrodes generate trapping potentials at pointlike RF-nulls above the DC electrodes 10, wherein ions can be trapped. A trap of this kind is, e.g., described in Journal of Applied Physics 105, 013114 (2009). The microtraps realized in this way form an array of well isolated traps.

According to a first embodiment of the present invention, an apparatus for trapping charged particles and performing controlled interactions between them is provided. The charged particles are typically positively charged. In particular, the charged particles may be ions. The ions may exemplarily be $^{40}Ca^+$, $^{138}Ba+$, $^{43}Ca+$, $^{9}Be+$, $^{24}Mg+$, $^{27}Al+$, $^{88}Sr+$ or mixtures thereof. Ions of the type $^{40}Ca^+$ have electronic and spin states advantageous for quantum manipulations, e.g., with the aid of lasers. In other embodiments, the charged particles are charged dust particles as described with respect to FIGS. 16 and 17. The apparatus may be an ion trap apparatus, in particular a surface-electrode ion trap apparatus. The apparatus may be adapted for trapping ions and performing controlled quantum interactions between them. A quantum interaction is an interaction wherein quantum coherence between the particles is maintained. For instance, a quantum interaction could be a quantum gate operation or quantum entangling operation that may be required for gate-based or measurement-based quantum computation. Unless stated otherwise, the apparatus will be referred to as an ion trap apparatus in the following and the charged particles will be called ions, but without intending limitation.

The ions may function as carriers of quantum information, e.g., as qubits or higher quantum logical entities (qutrits etc.). The theory of quantum computation is best developed on the basis of qubits at present. Ion qubits can be well isolated from the environment in ion traps and have long coherence times. However, for quantum computation, the ions need to interact, and the quantum operations need to be faster than the coherence time. Two- or multi-qubit operations, also called quantum gates or quantum gate operations, are needed for the creation of quantum entanglement or the implementation of a universal set of quantum gates. For ion qubits multi-qubit operations can be mediated by the Coulomb interaction and are dependent on distance between the ions. Further, to perform complex quantum algorithms it is advantageous to increase the number of qubits participating in the computation. The number of qubits that one can individually control should be therefore ideally scalable.

Figure 3:
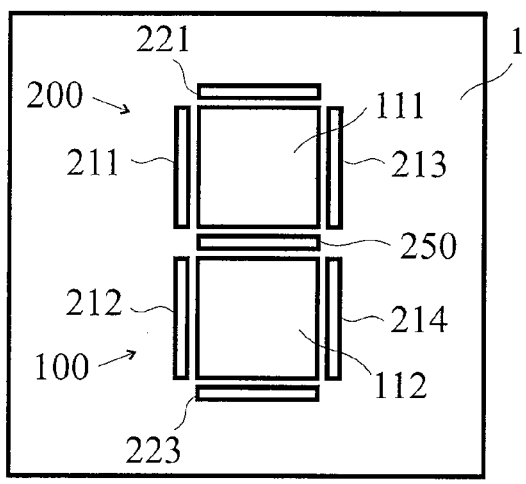
FIG. 3 shows an apparatus for trapping charged particles and performing controlled interactions between them according to embodiments described herein.

According to embodiments described herein, the apparatus includes a substrate 1 as shown in FIG. 3. The substrate may be planar, and, in particular, be a wafer or a chip. The substrate may be made of insulating material such as an insulating dielectric, in particular material compatible with requirements of high vacuum. The substrate is typically adapted to provide structural integrity to the apparatus. The substrate may be made of or include the following materials: quartz, alumina, silica, and other ceramics. The substrate may be commercial printed circuit board laminates such as Rogers 4350b.

The apparatus includes dedicated DC electrodes 100. The apparatus further includes RF electrodes 200. The RF electrodes may be dedicated RF electrodes. Herein, the term "dedicated" means that the electrodes are configured to be driven by DC or RF voltages, respectively, or are arranged such that a trapping potential can be created by driving dedicated DC electrodes with DC voltage and RF electrodes with RF voltage. This may include that a dedicated DC electrode is connectable to a DC voltage source and a dedicated RF electrode is connectable to an RF voltage source. The RF voltage source may include an RF voltage drive, typically an RF voltage drive for providing high-voltage to the RF electrode. A dedicated DC electrode is unconnected to an RF voltage drive. A dedicated DC electrode may be a ground electrode, i.e., an electrode kept at ground potential. By using dedicated electrodes the complexity of the circuit is kept low. Capacitive coupling may exist between RF electrodes driven by RF voltages. Regarding dedicated DC electrodes, capacitive coupling between these electrodes does not exist and need not be considered for designing the trapping potentials.

In contrast, if non-dedicated electrodes were exclusively used, all configured to be driven both by DC and RF voltages, such an arrangement would suffer from complex circuit structure.

The dedicated DC electrodes 100 and the RF electrodes 200 are arranged on the substrate 1. The substrate is typically planar and has a first and a second substrate surface. These will also be referred to as the front surface and the back surface, respectively. The term "arranged on" means arranged on the first substrate surface or front surface. With respect to the substrate, the term "above" shall mean at a distance outward from the front surface, and the term "below" shall mean at a distance outward from the back surface. The dedicated DC electrodes 100 and the RF electrodes 200 are configured to generate a trapping potential for trapping the charged particles above the substrate surface.

According to the first embodiment shown in FIG. 3, the dedicated DC electrodes 100 include an array of dedicated DC electrodes 111 and 112. These will be referred to as trapping site DC electrodes. The trapping site DC electrodes 111 and 112 are configured to be biased with a DC bias voltage for contributing to the trapping potential. This notion shall include that they may be configured to be individually biased with different DC bias voltages.

The RF electrodes 200 include RF trapping electrodes 211, 212, 213, 214, 221, and 223. These are arranged along the outer sides of the trapping site DC electrodes 111 and 112. Generally, RF trapping electrodes may be arranged to circumferentially surround the whole array of dedicated trapping site DC electrodes. The RF trapping electrodes are configured to be driven with RF voltages for contributing to the trapping potential. The RF voltages may be fixed RF voltages, i.e., RF voltages the amplitude and/or frequency of which does not substantially change over time. Using fixed RF trapping electrodes simplifies the driving circuitry.

Between the trapping site DC electrodes 111 and 112 there is arranged an RF control electrode 250. The term "between" may mean that the RF control electrode is arranged at the same vertical distance on the substrate and separates the trapping site DC electrodes. The term "between" shall also include the possibilities that the trapping site DC and the RF control electrodes are arranged at different vertical distances from the substrate surface. Then, the RF control electrode may separate the trapping site DC electrodes when viewed from above, but need not necessarily physically separate them in the plane or at the vertical distance from the substrate surface where the trapping site DC electrodes are arranged. The RF control electrode is individually drivable. In particular, the RF control electrode is drivable independently from the RF trapping electrodes. In the first embodiment illustrated in FIG. 3, the trapping site DC electrodes 111 and 112 can be viewed as segmented DC electrodes and the RF electrodes 200 including the RF control electrode 250 as segmented RF electrodes.

The RF control electrode is configured to be individually driven by a respective adjustable RF voltage. The adjustable RF voltage can assume a first and a second value. The first value can be larger than the second value. The second value can be zero, in which case the RF control electrode is switched off.

Figure 4:
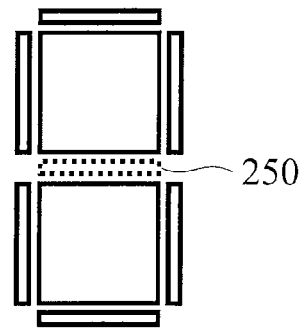
FIGS. 4 and 5-7 illustrate the functioning of the apparatus according to embodiments described herein.

This is schematically illustrated in FIGS. 3 and 4. The RF control electrode 250 in FIG. 3 shall schematically represent a state where the first value of the adjustable RF voltage is applied to the control electrode 250, and the FIG. 4 shall schematically represent a state where the second value is applied to the control electrode 250. This is indicated by the representation of RF control electrode 250 with a dotted line.

Figure 5:
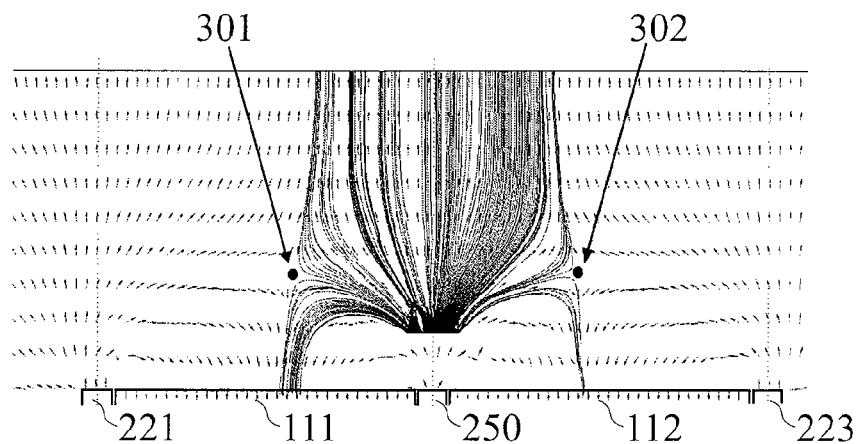

The trapping potential above and between the corresponding pair of trapping site DC electrodes 211, 212 forms separate charged particle traps adapted for trapping charged particles therein if the adjustable RF voltage takes the first value. In this case, there are two trapping sites above the two trapping site electrodes 211 and 212. FIG. 5 shows the situation illustrated in FIG. 3 in a view from the side of the substrate. Two ions 301 and 302 are trapped above the substrate in respective trapping sites of the trapping site DC electrodes 111 and 112, as shown in FIG. 5. Further, electrical field lines of the trapping potential generated above and between the trapping site DC electrodes are depicted. The electrical field lines illustrate that the ions are kept at an RF-null and are well-isolated from each other in deep potential wells with a potential barrier between them.

Figure 6:
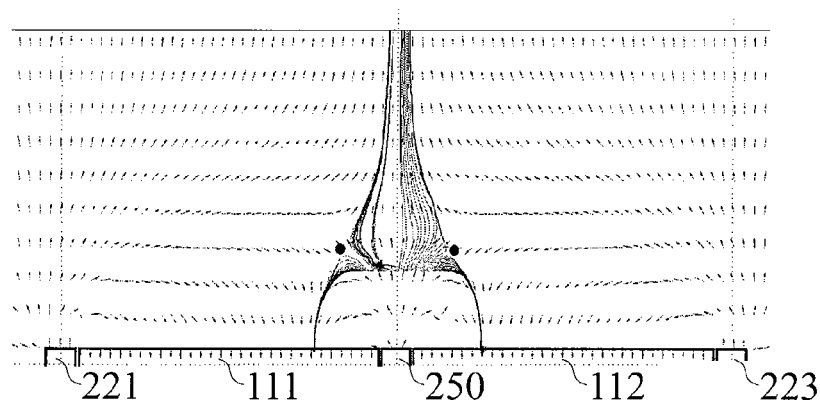
Figure 7:
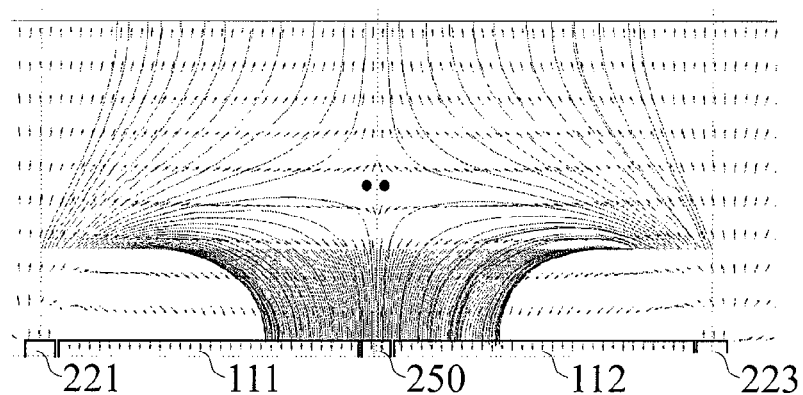

If the adjustable RF voltage takes the second value, the trapping potential above and between the corresponding pair of trapping site DC electrodes 211, 212 forms a charged particle interaction trap adapted for performing controlled interactions between charged particles. FIGS. 6 and 7 correspond to a situation as illustrated in FIG. 4. In FIG. 6, the second value is smaller than the first value, but different from zero. The field lines illustrate that the ions are still trapped at RF-null and move closer to each other to follow the RF-null position when the adjustable RF voltage is varied. The potential barrier between the ions is reduced. Interactions between the ions might already take place. In FIG. 7, the second value is zero. The field lines illustrate that the ions are still trapped, but now in one trapping site above and between the trapping site electrodes 111 and 112, forming the particle interaction trap. While the RF trapping electrodes (in the side view, only RF electrodes 221 and 223 are shown) provide a deep potential well for trapping the two ions in the particle interaction trap, the potential barrier between the ions is absent and strong interactions can take place between them. When increasing the adjustable RF voltage of RF control electrode 250 again, the situations of FIG. 6 and FIG. 5 are obtained. The representation of the ions 301 and 302 as particle-like dots in FIGS. 5-7 shall only serve illustrational purposes. In particular, effects of the quantum nature of the ions and the possibility of quantum interactions between them shall not be excluded.

The apparatus can therefore trap ions and keep them in traps or trapping sites that are well-isolated from each other and from the environment, as shown in FIGS. 3 and 5. On the other hand, controlled interactions, in particular quantum interactions, can be performed between the ions while still safely keeping them trapped and isolated from the environment, as shown in FIGS. 4, 6, and 7. As described above the RF control electrode between the trapping site DC electrodes can control the interaction and non-interaction states of the ions. The RF control electrode also moves the ions. In contrast, in the known ion traps (see FIG. 1) the DC voltages are used to move the ions, e.g., in the ion trap with segmented central DC electrode. However, segmented central DC electrodes cannot provide the advantageous trap configurations described above. The interactions and the isolation of the ions can also not be individually controlled in the known ion traps shown in FIG. 2.

According to further embodiments, the array of trapping site DC electrodes can be two-dimensional. The array may include at least one pair of trapping site DC electrodes arranged in a first direction on the substrate and at least one pair of trapping site DC electrodes arranged in a second direction on the substrate. The first and the second direction are independent directions, e.g., perpendicular to each other. The at least one pair of trapping site DC electrodes arranged in the first direction on the substrate may have an individually drivable respective RF control electrode arranged between them, and the at least one pair of trapping site DC electrodes arranged in the second direction on the substrate may have an individually drivable respective second RF control electrode arranged between them. The individually drivable RF control electrodes are individually drivable with respect to the RF trapping electrode(s). In some embodiments, they are also individually drivable with respect to each other. In this way, the individual control over ion trapping and interaction is maximized. In other embodiments it may suffice to exercise individual control only over groups of ions, e.g., if a cluster state for measurement based quantum computation is to be generated. Only groups of RF control electrodes may be individually drivable with respect to each other in such embodiments, for instance the group of RF control electrodes between trapping site DC electrodes arranged in the first direction may be individually drivable with respect to the group of RF control electrodes between trapping site DC electrodes arranged in the second direction.

Figure 8:
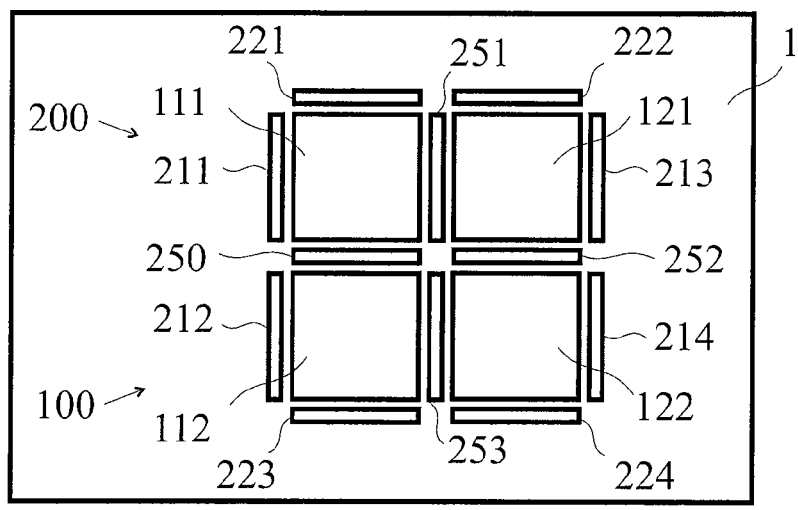
FIG. 8 shows an apparatus for trapping charged particles and performing controlled interactions between them according to embodiments described herein.

FIG. 8 shows an embodiment of the apparatus including a two-dimensional array of four trapping site DC electrodes 111, 112, 121, and 122 arranged in a two-by-two rectangular lattice or matrix. The array of trapping site DC electrodes is circumferentially surrounded by RF trapping electrodes 211, 212, 223, 224, 214, 213, 222, and 221. Each pair of trapping site DC electrodes has a respective RF control electrode arranged therebetween. The pairs (111, 112) and (121, 122) of trapping site DC electrodes are arranged in the first direction on the substrate 1 (up-down direction in FIG. 8). An RF control electrode 250 is arranged between the pair (111, 112) of trapping site DC electrodes, and an RF control electrode 252 is arranged between the pair (121, 122) of trapping site DC electrodes. The pairs (111, 121) and (112, 122) of trapping site DC electrodes are arranged in the second direction on the substrate 1 (left-right direction in FIG. 8). An RF control electrode 251 is arranged between the pair (111, 121) of trapping site DC electrodes, and an RF control electrode 253 is arranged between the pair (112, 122) of trapping site DC electrodes. Generally, at least one pair of trapping site DC electrodes has an individually drivable RF control electrode arranged in between. For instance, one pair of trapping site DC electrodes has an individually drivable RF control electrode arranged therebetween, or two, three, four or more pairs of trapping site DC electrodes have an individually drivable respective RF control electrode arranged between them, or each pair of trapping site DC electrodes has an individually drivable respective RF control electrode arranged in between.

Figure 9:
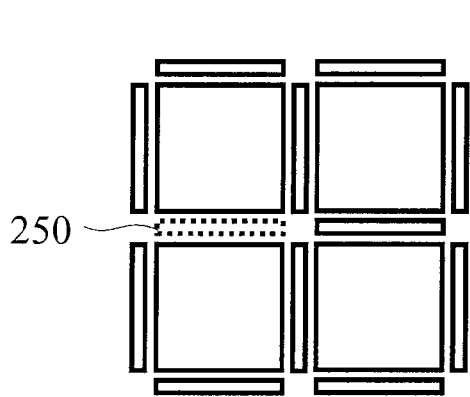
FIGS. 9 and 10 illustrate the functioning thereof.
Figure 10:
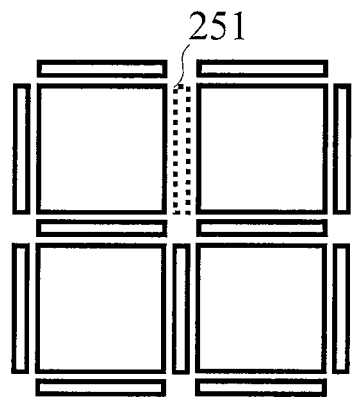

FIGS. 9 and 10 illustrate controlled interactions between ions trapped in the apparatus of FIG. 8. For instance, three ions may be loaded into the apparatus of FIG. 8, and the trapping potential is adjusted such that one ion is trapped above each of the trapping site DC electrodes 111, 112, and 121. As shown in FIG. 9, a controlled interaction between the two ions trapped above the electrodes 111, 112 is performed in the first direction on the substrate 1, e.g., as explained with respect to FIGS. 3-7 by lowering the adjustable RF voltage of RF control electrode 250 from a first to a second value. Afterwards, the ions may be isolated again by raising the RF control voltage. A controlled interaction may be performed between the two ions trapped above the electrodes 111, 121 in the second direction on the substrate 1 as shown in FIG. 10, e.g., by lowering the adjustable RF voltage of RF control electrode 251 from a third to a fourth value. The third and the first value may be the same. The fourth and the second value may be the same. Afterwards, the ions may be isolated again by raising the RF control voltage. The interaction in the second direction may be performed in substantially the same way as described with respect to FIGS. 3-7. In particular, the ions may be moved along an RF-null in the first direction (FIG. 9) and second direction (FIG. 10) by adjusting the respective RF control voltages, interact, and be moved back and isolated into separate trapping sites. In this way, for instance, quantum gate or entangling operations may be performed between ions in the two-dimensional array.

The ability to perform individually controlled interactions in two-dimensional trap arrays is an advantage over one-dimensional, linear traps or trap arrays and improves the scalability of quantum systems with which quantum simulations or quantum computation may be performed. For example, entangling a two-dimensional rectangular array of ions may naturally lend itself to the generation of cluster or graph states for performing measurement-based quantum computations. To generate the respective cluster or graph states in a one-dimensional trap array, on the other hand, is hardly feasible. The apparatus of the present invention therefore offers a considerable advantage over the known ion traps. The design of the ion linear ion trap of FIG. 1 and of the similar ion trap with segmented central DC electrode cannot be extended to the two-dimensional case. The two-dimensional arrays of isolated traps shown in FIG. 2 cannot provide individual interaction control in two independent directions on the substrate.

Generally, a trapping site DC electrode may have at least one of the following properties. The trapping site DC electrode may be made of copper, gold, platinum, silver, copper, niobium or mixtures/alloys thereof. The lengths of the sides of the trapping site DC electrode may be less than 2 mm, less than 500 µm, less than 350 µm, less than 100 µm or even less than 50 µm. The lengths of the sides may be from 5 µm to 2 mm, or from 5 μm to 500 μm, or from 10 μm to 350 μm, or even from 10 μm to 100 μm. A size in these ranges allows for individual addressing of the ions, e.g., imaging by lasers, for controlled movement of the ions, and possibly for performing quantum coherent manipulation of the ions. The area of the trapping site DC electrodes may be from 100 μm² to 4 mm² or from 100 μm² to 0.25 mm², e.g., from 100 μm² to 22500 μm² or from 22500 μm² to 122500 μm². The trapping site DC electrodes may be rectangular or square. The trapping site DC electrodes may have a different shape such as the shape of a polygon or regular polygon. For instance, the trapping site DC electrodes may be triangular or hexagonal. The trapping site DC electrodes may also be oval or circular.

Figure 11:
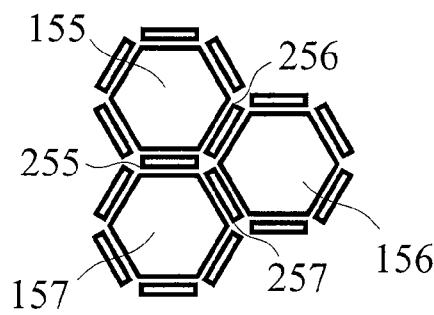
FIGS. 11 and 12 show further variants of the apparatus according to embodiments described herein.

FIG. 11 shows a two-dimensional array of hexagonal trapping site DC electrodes 155, 156, and 157 arranged in the manner of a hexagonal lattice with RF control electrodes 255, 256, and 257 between respective pairs (155, 157), (155, 156), and (156, 157) of the DC electrodes. The arrangement is circumferentially surrounded by RF trapping electrodes on the outer sides of the hexagonal DC electrodes. Here, the (pairwise) independent directions on the substrate are not perpendicular to each other, but form angles of ±60° with each other. Hexagonal or triangular or other non-rectangular shapes may be advantageous to study spin frustration effects.

The array of dedicated trapping site DC electrodes may include N trapping site DC electrodes as described herein, where N is a natural number larger than one. The number N may be larger than two, larger than 3, 4, 5, 6, 8, 9, 15, or even larger than 24. The number N may, e.g., be 2, 3, 4, 6, 9, 16, or 25. If the array is square it may, e.g., be a 2×2, 3×3, 4×4 or M×M array, where M is an integer larger than 4. The larger the array is, the more ions may be loaded and individually trapped and controlled to interact. Larger arrays allow for more complex simulations of quantum systems such as solid state systems and for more complex quantum computations. The array may, at least partly, be a rectangular, square, triangular, or hexagonal array. The array may be composed of different such types. For instance, the array may have the form of a Kagome lattice.

Generally, an RF trapping electrode may have at least one of the following properties. The RF trapping electrode may be made of copper, gold, platinum, silver, copper, niobium or mixtures/alloys thereof. The RF trapping electrodes may be rectangular or square. The length of at least one side of an RF trapping electrode may be less than 500 μm, less than 400 μm, less than 350 μm or even less than 300 μm. The lengths of at least one side may be from 50 μm to 500 μm, or from 100 μm to 400 μm, typically from 150 μm to 350 μm. At least one side may have substantially the same length as a side of a trapping site DC electrode, i.e., the difference in the length of the respective sides is at most 10% or at most 5%. The above may apply in particular in the case that RF trapping electrodes are segmented electrodes as shown in FIGS. 3, 4, and 8-11. According to some embodiments, the number of RF trapping electrodes is less than the number of sides of the trapping site DC electrodes along the circumference of the array. The number of RF trapping electrodes may be less than five, e.g., four, three, two, or one. RF trapping electrodes may have curved sides or sides with curved portions.

Figure 12:
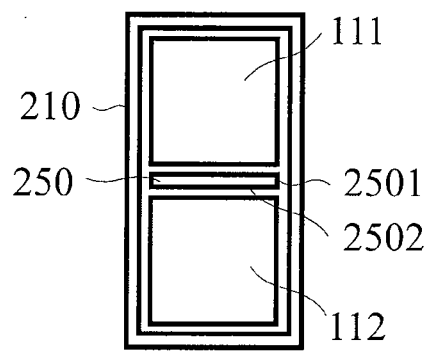

The apparatus shown in the embodiment of FIG. 12 is similar as the apparatus of FIG. 3, but has one common RF trapping electrode 210 instead of the segmented RF trapping electrodes 211, 212, 213, 214, 221, and 223 of FIG. 3. The advantage of a common RF trapping electrode is a simplified control circuitry, whereas the advantage of the segmented RF trapping electrodes is an increased flexibility in optimizing the trapping potential.

Figure 16:
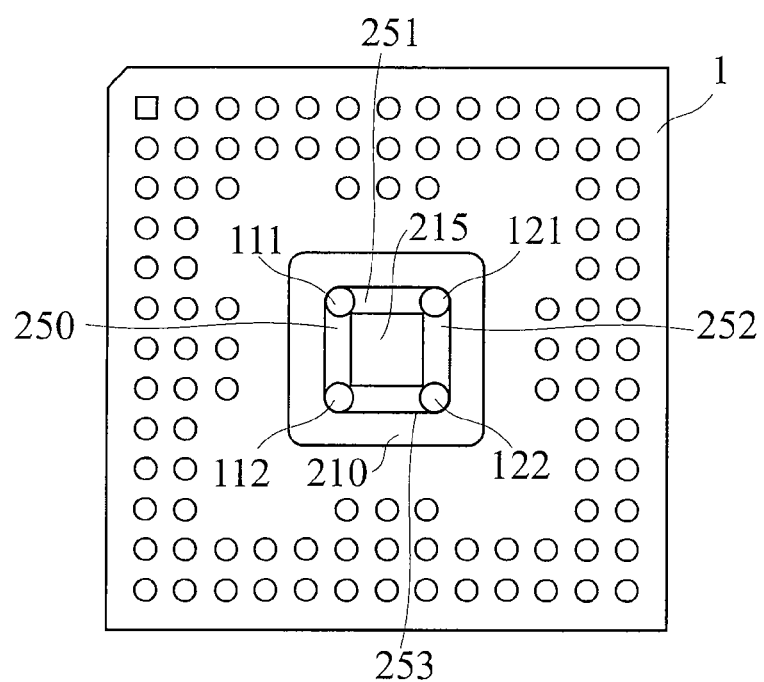
FIGS. 16 and 17 respectively show a schematic chip layout and photography with overlaid schematic chip layout of an apparatus according to embodiments described herein for trapping charged dust particles.

An RF control electrode may generally have at least one of the following properties. The RF control electrode may be made of copper, gold, platinum, silver, copper, niobium or mixtures/alloys thereof. The RF control electrode may have a long side and a short side, and may, e.g., be rectangular. The length of at least one side of an RF control electrode may be less than 5 mm, less than 2 mm, less than 500 μm, less than 350 μm, less than 100 μm or even less than 50 μm. The length of at least one side may be from 5 μm to 5 mm, from 5 μm to 500 μm, or from 10 μm to 350 μm, or even from 10 μm to 100 μm. At least one side may have substantially the same length as a side of a trapping site DC electrode, i.e., the difference in the length of the respective sides is at most 10% or at most 5%. This side might be the long side. Then, the other side, the short side, may be considerably shorter, e.g., only at most 50%, 40%, 30%, 20%, or even at most 10% of the length of the longer side. This situation is, e.g., illustrated in FIGS. 3, 4, 8-12, and such a design is compact. However, the aspect ratio may be the opposite, which may be advantageous for optimal trap depth, such as for efficiency of holding the ions versus drive voltage. In this case, the short side may have substantially the same length as a side of a trapping site DC electrode. The other side, the long side, may considerably longer, e.g., 150%, 200%, 300%, 400% or even more than 400% of the length of the short side. For instance, the control electrode may be 4 times as long as it is wide. Such a situation is illustrated in FIG. 16.

According to some embodiments, at least one side of an RF control electrode is shorter than a side of a corresponding trapping site DC electrode. A "corresponding trapping site electrode" is one electrode out of the pair of trapping site DC electrodes between which the RF control electrode is arranged. This shorter side may be arranged in a direction connecting the corresponding pair of trapping site DC electrodes. For instance, if the trapping site DC electrodes are arranged along the first direction on the substrate, the shorter side may lie along the first direction. If the trapping site DC electrodes are arranged along the second direction on the substrate, the shorter side may lie along the second direction. The shorter side of the RF control electrode may be shorter by at least 50%, at least 60%, at least 70%, at least 80%, or even at least 90% as compared to a side of the corresponding trapping site DC electrode. This shorter side may have a length from 5 μm to 2 mm, or from 5 μm to 250 μm, or from 10 μm to 50 μm, typically from 10 μm to 35 μm.

FIG. 12 exemplarily illustrates a rectangular RF control electrode 250 having long sides or edges 2502 and short sides or edges 2501. The long sides are parallel to the neighboring sides or edges of the corresponding pair of trapping site DC electrodes 111 and 112. The short sides are perpendicular to the long sides.

According to other embodiments, at least one side of an RF control electrode is longer than a side of a corresponding trapping site DC electrode. This longer side may be arranged in a direction connecting the corresponding pair of trapping site DC electrodes. For instance, if the trapping site DC electrodes are arranged along the first direction on the substrate, the longer side may lie along the first direction. If the trapping site DC electrodes are arranged along the second direction on the substrate, the longer side may lie along the second direction. The longer side of the RF control electrode may be longer by at least 150%, at least 200%, at least 300%, or even at least 400% as compared to a side of the corresponding trapping site DC electrode. This longer side may have a length from 15 μm to 5 mm, or from 15 μm to 3.5 mm, or from 15 μm to 500 μm, or from 30 μm to 400 μm, typically from 40 μm to 350 μm. FIG. 16 illustrates such a design. As compared to the design of FIG. 8, the design with "stretched" control electrodes shown in FIG. 16 has a center RF trapping electrode 215. Generally, the apparatus may include at least one center RF trapping electrode, e.g., one center RF trapping electrode per 2×2 sub-array or trapping site DC electrodes if the lattice structure of the array is square, or one center RF electrode per subgroup of 3 trapping site DC electrodes forming a triangle if the lattice structure of the array is hexagonal.

The shape of the RF control electrode with a long side and a short side provides several advantages. For instance, in a design with non-dedicated electrodes of like dimensions arranged like pixels in a regular square array and driven both by RF and DC voltages to form the desired trap types at runtime, ions trapped above respective ones of these "pixel" electrodes would have to be transported over a distance of more than pixel length to interact with each other and be separated again, e.g. by the known transport mechanism of segmented DC electrodes. In the design where the neighboring, corresponding trapping site DC electrodes are spaced apart only by a comparably short distance with a slim, RF control electrode therebetween, distances between the ions are short. This might be favorable for fast gate operations in quantum computing. In the design where the control electrodes are "stretched", the trapping efficiency (capability of holding the ions versus drive voltages) may be increased, and the trap depth be optimized. Generally, with the apparatus according to embodiments described herein, when the control voltage is lowered (including lowering to the value zero), ions formerly trapped above the trapping site DC electrodes can quickly interact in the resulting interaction trap, and also be quickly separated afterwards by simply increasing the control voltage. Hence, the interaction time to achieve a desired controlled interaction can be reduced, which may be particularly advantageous for quantum interactions, where the interaction time should be short as compared to the time during which quantum coherence between the ion states can be kept.

Generally, an RF control electrode may be an RF middle electrode, in particular a common RF middle electrode in between the corresponding pair of trapping site DC electrodes, as exemplarily shown in FIGS. 3, 4, 8-12. The RF control electrode may be the sole electrode between the corresponding pair of trapping site DC electrodes, and no other electrode might be present between the respective pair of trapping site DC electrodes. In this way, as opposed to the "pixel design", the control circuitry may be kept simpler.

The properties of the electrodes described herein may apply to one or more of the respective electrodes, or to any group of respective electrodes or even to each electrode of the respective type. For instance, all or any subset of RF control electrodes may be alike. Similarly, all or any subset of RF trapping electrodes may be alike. RF control and RF trapping electrodes may be alike. Also, dedicated DC electrodes may be alike (or any subset thereof). In this way, the design is kept simple.

Figure 13:
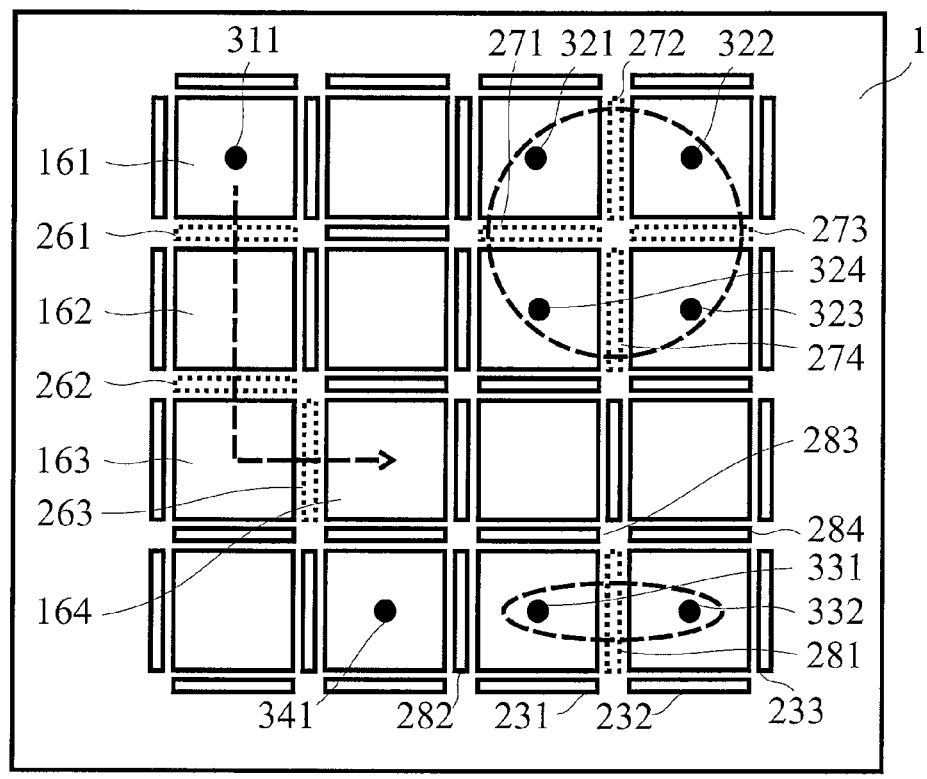
FIG. 13 shows an the apparatus and its functioning according to embodiments described herein.

FIG. 13 illustrates some of the possibilities and functionality of the apparatus. In the embodiment shown in FIG. 13, a four-by-four square arrangement of trapping site DC electrodes is shown, which are surrounded by 16 RF trapping electrodes and separated by 24 RF control electrodes. An ion 311 may be transported in two dimensions as indicated by the dashed arrow. To this end, the control electrodes 261, 262, and 263 between trapping site DC electrodes 161, 162, 163, and 164 may be switched off. Thereby, a linear trap part is formed consisting of the upper three trapping site DC electrodes 161, 162, 163 of the leftmost column of the four-by-four array, and a T junction is formed at trapping site DC electrode 163 towards trapping site DC electrode 164. The ion 311 may be moved from its current position to the final position indicated by the dashed arrow by applying a DC bias at least to the electrodes 161, 162, and 163. Therein, the ion remains at an RF null even while moving in two dimensions on the substrate, and micromotion is not induced. Ion 311 may, e.g., be made to interact with ion 341 in a subsequent step. If the function of the electrodes 161-164 is restricted to ion transport, it may be sufficient to drive RF control electrodes 261-263 only with a common control voltage as opposed to individual control voltages with respect to each other. Generally, if groups of RF control electrodes are jointly driven, the control circuit may become simpler, but the number of functions that can be performed may be reduced. Also, generally, moving the ions on the substrate may be performed additionally to, or instead of, performing controlled interactions. In particular, the ions may be moved in two independent directions on the substrate, typically while being positioned at an RF null of the trapping potential.

Further, ions 321, 322, 323, and 324, which were trapped above the upper-right two-by-two subarray are presently interacting as indicated by the dashed circle around them. The RF control electrodes 271, 272, 273, and 274 have lowered their potential barriers to this end, e.g., to zero. A quantum interaction between four ions can be realized in this kind of a trap, for instance to generate an entangled cluster state of the four ions. On the bottom right is shown an interaction between ions 331 and 332 as indicated by the dashed oval, wherein RF control electrode 281 is shut off. Ion 341, on the other hand, is well-isolated from ions 331. Generally, RF control electrodes driven by the adjustable RF voltage that takes the first value (or other value that provides a potential barrier for isolating an ion) may act similarly or in the same way as the RF trapping electrodes. For instance, the RF voltages applied to the RF control electrodes 282, 283, 284 may be adjusted to be the same as the RF voltages applied to the RF trapping electrodes 231, 232, 233 in FIG. 13.

The apparatus may further include RF drives for driving the RF electrodes with RF voltages. The apparatus may include DC drives/DC voltage sources for driving the dedicated DC electrodes with a DC voltage. DC voltages may be adjustable, e.g., for optimizing the trapping potential or for ion transport. Each of the trapping site DC electrodes (or subsets thereof) may be driven by common DC voltages from a common DC drive/voltage source, e.g., be held at ground potential, or be driven by individual DC voltages from separate DC drives. The dedicated DC electrodes are not connected to an RF drive. The control circuit may be simplified in this way and inter-electrode capacitive coupling be reduced.

According to some embodiments, RF drives providing an RF voltage of fixed value are connected with the RF trapping electrodes. RF drives with adjustable voltage are connected to the RF control electrodes. Therein, each RF control electrode and/or each RF trapping electrode (or any subset thereof) may be driven by a separate RF drive. The RF electrodes may be commonly or individually be biased with secondary DC voltages, e.g., to optimize the trapping potential. The RF electrodes may be sub-segmented themselves and biasable with different secondary DC bias voltages within one RF electrode. The secondary DC voltages may vary, e.g., during quantum gate operations. The secondary voltages are smaller than the primary RF voltages, typically smaller by at least one order of magnitude or even two orders of magnitude. The secondary voltages may, e.g., be at most one tenth of the primary RF voltages or even one hundredth of the primary RF voltages. The RF electrodes are primarily driven by their respective RF voltages to generate the RF component of the trapping potential and to control interactions between the ions. RF drives can be built from LC resonators and RF amplifiers.

According to some embodiments, the apparatus includes one or more vias through the substrate for contacting the electrodes. For instance, the trapping site DC electrodes and/or the RF control electrodes may be contacted from the backside of the substrate. The RF trapping electrodes may be contacted by leads running on the front surface away from the electrode array, but may also be contacted by means of vias from the backside. Using vias provides better access for using lasers to create quantum interactions. Further, using vias offers the possibility to build the apparatus with more flexible design and layout, which contributes to performing interactions of quantum nature between the ions. Alternatively, gold bonding could be used to connect the electrodes to the drives or other control parts.

The apparatus may further include a controller for providing, and possibly adjusting, RF and/or DC voltages. The controller may be connected to the respective voltage drives/sources and control their operation. In particular, the controller may control the time periods during which first, second or other values of the adjustable RF voltages are provided by the RF drives to the RF control electrodes. The controller may also control which DC voltages are applied to the DC electrodes and/or which secondary DC voltages are applied to the RF electrodes, and/or how DC voltages are varied over time. In this way, the controller may control the interactions between the ions, and, e.g., drive quantum gate operations or (parts of) a quantum computation. The controller may be configured to lock the phase of RF voltages. Alternatively, the voltage drives are configured to lock the phase of the RF voltage they supply to a reference voltage as described below.

The controller may be realized in the form of one or more conventional computers or microchips, connected to the voltage drives, possibly programmed by appropriate software. Typically, control computers are used to control the voltages on the electrodes. In some embodiments, the controller and/or the voltage drives are arranged on the substrate. Controller, RF and DC drives are part of the control circuitry of the apparatus. The whole control circuitry or any part thereof may be integrated on the substrate, i.e., be an on-chip control circuit. The whole or parts of the circuits of the, the RF drives and/or the DC drives may be arranged on the backside of the substrate, or may be arranged on the frontside outside of the region of the array, or be partly arranged on the backside and partly on the frontside of the substrate. The advantage of such on-chip solutions is a compact, ready-to-use design. Further, if the apparatus is put into a vacuum environment (in particular for quantum interactions/quantum computation) no extra components like external RF drives or control circuitry need to be placed in the vacuum environment where they may worsen the vacuum conditions by outgassing.

Varying the adjustable RF control voltage(s) of the one or more RF control electrodes may lead capacitive couplings between the electrodes. This can disturb the trapping potential above other trapping sites. To counteract the effects of capacitive coupling, means for ensuring fixed phase relations between the RF voltages may be provided. These means may be part of the RF drives. In particular, the means may include a phase locking portion for locking the phases of the RF voltages to a reference phase. The locking portion may be adapted for actively locking the phases by providing feedback control. Alternatively, the means may include a balancing circuit for balancing the changing loads on the RF drives due to the capacitive coupling. The adjustable RF control electrodes and/or the RF trapping electrodes may be drivable with sine-shaped voltage patterns of different, possibly time-varying amplitude, but with the same phase.

Figure 14:
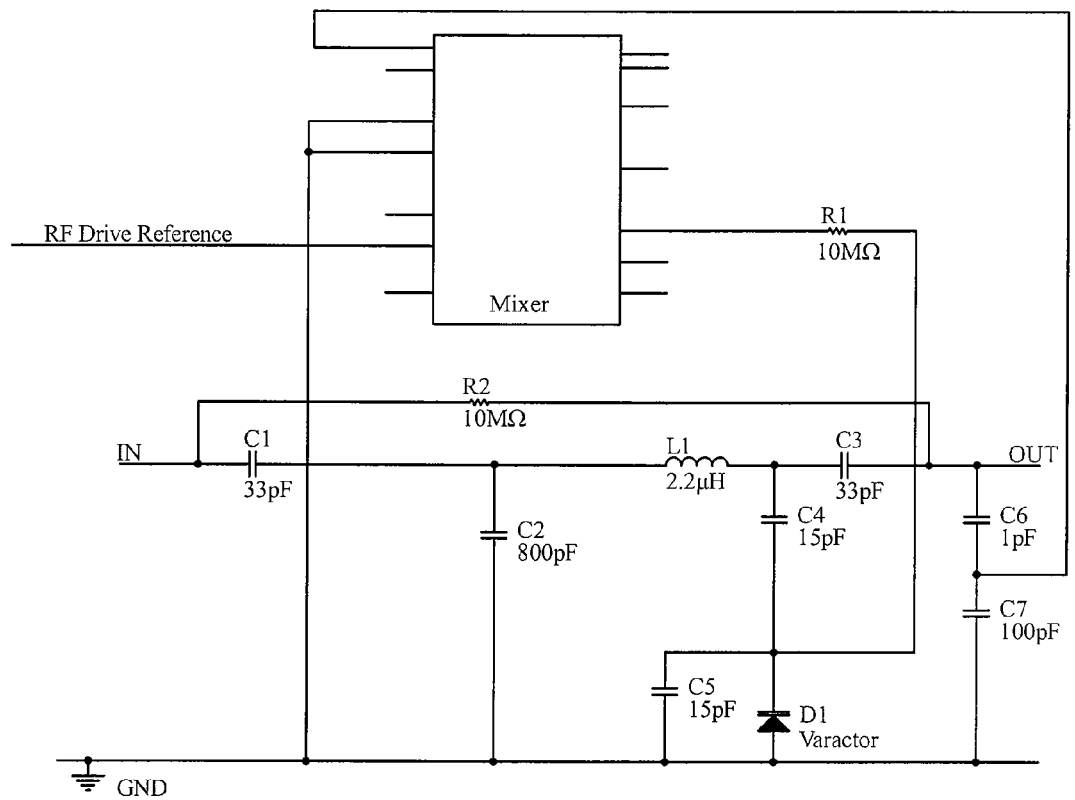
FIG. 14 shows a circuit diagram illustrating the locking of the RF phase of RF electrodes according to embodiments described herein.

FIG. 14 illustrates an RF drive circuit of an RF electrode. The RF drive illustrated in FIG. 14 is adapted to generate high RF voltages and to provide a phase lock to a reference voltage. The reference voltage is named "RF Drive Reference" in FIG. 14. The reference voltage may be provided by a master oscillator, e.g., a resonator, GPS-clock or crystal providing a reference signal for phase and frequency reference. The reference voltage is input to mixer or multiplier. The mixer may include a logarithmic input stage for taking in different power levels. The mixer may be an AD8302 module. The RF drive receives an input RF signal at the position referenced by "IN", e.g., a 10 V signal provided by function generator and RF amplifier. An RF signal which is amplified and locked in frequency and phase is provided at the position "OUT", from where the RF signal may be directly fed to an RF electrode (e.g., an RF trapping electrode) or be fed to an attenuation circuit first, such that the voltage may be individually adjusted (e.g., for RF control electrodes). The amplification is performed by an LC-circuit, sometimes called a tank circuit resonator. Therein, the inductor L1 provides the inductance part of the LC circuit, and the capacitance part is provided by capacitors C4, C5, C6, C7, and varactor D1 (variable capacitor). Capacitor C2 serves to compensate for the absence of impedance of the LC-circuit at resonance. Capacitor C1 may be used for phase adjustment, and capacitor C3 provides DC-isolation of the "OUT" signal. High-ohmic resistor R2 sets a DC bias to the "OUT" signal if such a bias is provided to the "IN" signal. The DC bias may be used as the secondary DC voltage on the RF electrode, e.g., to optimize the trapping potential and/or for shuttling around ions. Ground potential is denoted by "GND". The "OUT" signal is tapped off in an attenuated form (e.g., 1/100 of the RF voltage at "OUT") between capacitors C6 and C7, acting as a capacitive divider, and fed back to the mixer. The mixer produces an error signal from the reference signal and the OUT signal that is fed back. The error signal carries information on phase and frequency error. By varying the capacitance of the varactor D1, the varactor D1 and the resistor R1 may function to tune the resonance frequency of the whole LC circuit. Frequency and phase errors are can be corrected in this way. The varactor and the feedback loop actively lock the phase to the phase of the reference signal. One or more or each of the RF electrodes may be connected to such an RF drive. The drive circuit may be built on-chip as described herein. The values of capacitors, inductors, and resistors in the respective units provided in FIG. 14 are only exemplary.

Figure 15:
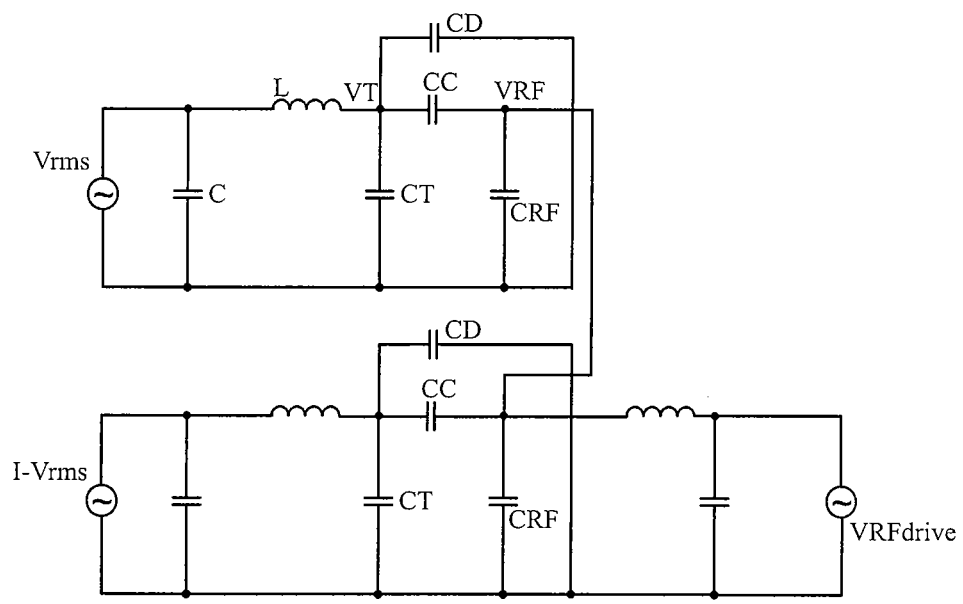
FIG. 15 shows a circuit diagram illustrating a balancing of the RF drive circuit to stabilize the phase relation between an RF voltage applied to an RF electrode and a reference RF voltage.

A further variant of the means for ensuring fixed phase relations between RF voltages is shown in FIG. 15. The means include a balancing circuit. The balancing circuit balances the changes in the load on the LC resonator. No feedback control is needed in this case. FIG. 15 shows an equivalent circuit diagram wherein VRFdrive is the RF drive voltage, which is typically fixed and may be provided by a function generator. Vrms is an adjustable voltage that may be provided by a function generator, and can be adjusted between 0-100% of VRFdrive. The voltage "1-Vrms" is the "mirror voltage" of Vrms. For instance, if Vrms is 30%, then 1-Vrms is 70%. Inductance L and capacitance C form the main LC resonator for amplification of the (first) resonator. Voltage VRF is the actual (typically fixed) high RF voltage obtained from the resonator circuit, and VT is the actual adjustable high RF voltage of the RF control electrode, obtained from the resonator circuit. In order to compensate changing load on VRFdrive, a second "mirror" resonator is driven with the voltage 1-Vrms. More specifically, the capacitance of the adjustable RF control electrode is represented as a capacitor CT, and the capacitance of a (fixed) RF trapping electrode is represented as a capacitance CRF. The capacitances CC and CD represent the capacitive couplings. Without balancing circuit a change in Vrms changes the load (the total capacitance) in the (first) resonator, leading to phase loss. For balancing the circuit, the capacitances CC and CD are selected to be the same. The lower part of the circuit provides a certain symmetry to the whole setup by means of the mirror resonator. In particular, the same components (electrodes) with the same capacitances (and capacitive couplings) are duplicated. However, the connection to the respective voltages is inverted in the sense that where a connection to the RF voltage is present in the upper part, a connection to ground is present in the lower part an vice versa, and the adjustable voltage is set to 1-Vrms. In this way, the circuit is balanced, and changing the adjustable drive control voltage Vrms does not lead to a change in the resonator load and to phase loss. For compensating the couplings of the adjustable RF electrodes and of the main RF drives, the setup may be duplicated again. Two resonators are needed, where the second corrects the first. Four whole trap arrays may be built, of which only one is used for ion storage. The electrodes of the other three arrays are connected in the way described herein to balance the capacitive couplings of the first.

A system for trapping charged particles and performing controlled interactions between them is provided according to further embodiments. The system includes the apparatus according to embodiments described herein. Typically, the apparatus includes the RF and dedicated DC electrodes integrated on a substrate or chip and control circuitry. It is advantageous for performing quantum interactions to miniaturize at least the on-substrate components. Downscaling the trap sizes may lead to small ion-electrode separation resulting in high heating rates. The system may include a cryostat for cooling the apparatus. Cooling the apparatus reduces heating and heat-induced motion of the ions and prolongs the coherence times during which controlled quantum operations can be performed between the ions. The system may also include a vacuum chamber for providing a vacuum environment to the apparatus. The vacuum in the vacuum chamber may range from $10^{-8}$ mbar to $10^{-13}$ mbar, more typically from $10^{-9}$ mbar to $10^{-12}$ mbar, such $10^{-10}$ mbar or less. The cryostat may allow for the electronics (control circuit) to be placed inside the vacuum chamber, or even be integrated on the substrate, e.g., on the backside of the substrate and/or on the frontside of the substrate outside of the region of the array.

The system may further include at least one of the following components: one or more lasers for ionization of atoms, for loading ions into the apparatus, for addressing ions to perform quantum manipulation, for cooling ions and/or for imaging ions, a pulse sequencer to control the length and frequency of laser pulses to the ions, a camera and/or photomultiplier to detect the state of the ions, a set of magnetic field coils to set the quantization axis of the ion, an ion pump to maintain the pressure of the vacuum chamber, optical tables to isolate the system from vibrations, a temperature stabilized fabry-perot optical resonator which the lasers are locked to—providing a stable laser frequency, and many optical components such as mirrors and lenses to control the delivery of the laser light.

Figure 17:
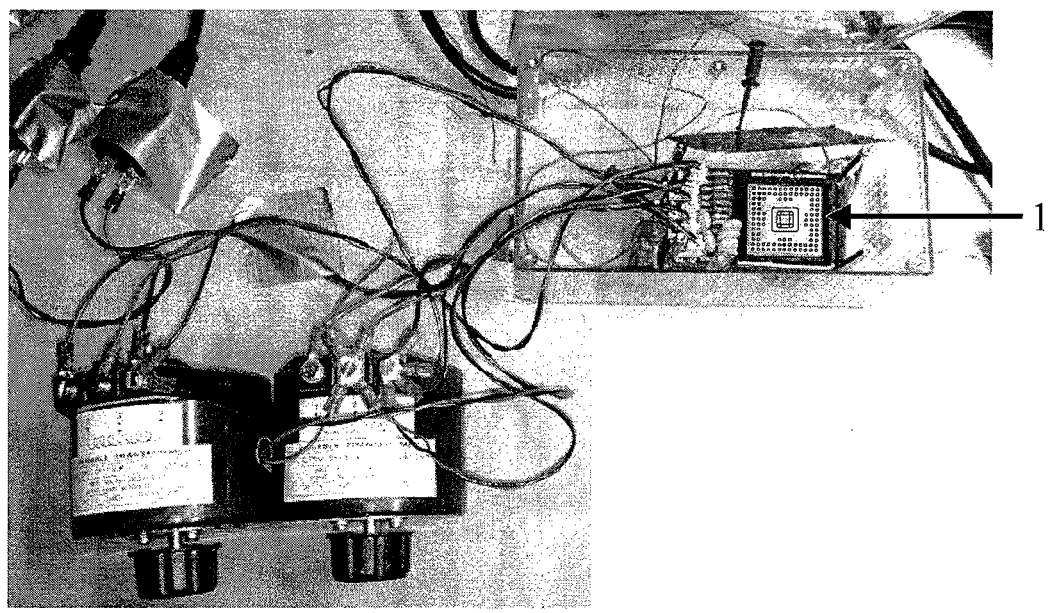

FIGS. 16 and 17 show an on-chip planar "macro" trap apparatus for trapping charged dust particles. Since the charge-to-mass ratio is much smaller for the charged dust particles as compared to the charge-to-mass ratio of ions, the trapping frequencies that depend on this ratio are also much lower. The "radio frequencies" for trapping dust particles are actually much lower than, e.g., 10 MHz. The trap illustrated in FIGS. 16 and 17 operates at 50 Hz. The scaling down of the RF frequencies for smaller charge-to-mass ratio of the charged particles that are trapped is to be taken into account. Hence, the notion of "RF frequency" may refer to frequencies not normally considered as "radio frequencies" in the case of trapping charged particles with small charge-to-mass ratio, e.g., dust particles. Conversely, the dimensions of the electrodes may scale up for these larger particles, while the design of the trap may otherwise be unchanged. The layout of the dust trapping apparatus on chip 1 is similar as in FIG. 8, but a single common fixed-RF electrode 210 is provided to circumferentially surround the arrangement of trapping site DC electrodes 111, 112, 121, and 122, similarly as in FIG. 12. Further, a fixed-RF trapping electrode 215 is provided in the center of the arrangement. RF control electrodes 250, 251, 252, and 253 are shown between corresponding pairs of trapping site DC electrodes. The DC trapping site electrodes and the chip are connected to ground potential. The circular trapping site DC electrodes have a radius of 1 mm, and the distance from the center of a trapping site DC electrode to the center of the neighboring trapping site DC electrode is 6 mm. The electrodes are connected from the backside of the chip by means of vias. FIG. 17 shows a photograph of the "macro" trap, wherein the schematic layout of FIG. 16 has been overlaid on the photography at the position of the chip 1. The RF drives may be seen on the left connected by wires to the "macro" trap and to a power supply (not shown). The dust trap apparatus may be used to capture, concentrate and/or analyze smoke particles therein. Analysis can thereby be performed by using the dust trap apparatus as a parallel mass spectrometer, as described further below. For instance, the dust trap may capture cigarette smoke, possibly for air purification. The dust trap may capture smoke from a fire and perform analysis of the smoke components, e.g., to identify the source of burning material and its hazard potential, and may transmit the information together with a fire alarm.

Embodiments of the apparatus as described herein at least partially solve the technical problems stated in the beginning, namely individual control of the interaction and interaction distance between all neighboring ions (or other particles), and scalability of the apparatus. According to some embodiments, an ion trap array is provided where nearest neighbor traps share at least the same RF control electrodes, and RF electrodes are segmented in the sense that each trap shares an individual electrode with each nearest neighbor trap. The individual electrodes can be addressed and controlled individually. Individual RF electrodes may be driven with a sine waveform of different, possibly time varying, amplitude, but all share the same phase. In such embodiments, each ion is trapped in its own point-like RF null as long as the separating potential of the respective RF control electrodes is not set to zero. Changing the RF potential that separates two nearest neighbor traps also changes the two corresponding RF nulls. This may be done in two dimensions on the substrate. When moving the ions they remain at their RF null and micromotion is minimal throughout the controlled operation. The apparatus of some embodiments allows for the storage of a large number of ions and controlled interactions between nearest-neighbor ions, for the coupling in two dimensions and for parallel operations. The adjustable RF electrode(s) allow for various different designs of coupled traps and the switching between these designs. For instance, such designs or layouts of traps may be: individual traps, nearest-neighbor coupled traps (possibly in two dimensions), nearest-neighbor rings, linear traps, and clusters of coupled traps such as the whole array.

A method for trapping charged particles and performing controlled interactions between them is provided according to further embodiments. Performing controlled interactions may generally include performing a quantum gate operation. The method includes providing dedicated DC and RF electrodes arranged on a substrate. The dedicated DC and RF electrodes include at least one RF trapping electrode, and an array of two or more trapping site DC electrodes, wherein at least one pair of trapping site DC electrodes has an individually drivable respective one RF control electrode arranged therebetween. The method may include providing the apparatus according to any of the embodiments described herein. The apparatus may include a two-dimensional array of trapping site DC electrodes. The array may include at least one pair of trapping site DC electrodes arranged in a first direction on the substrate and at least one pair of trapping site DC electrodes arranged in a second direction on the substrate. The first and second direction may be independent directions on the substrate. The at least one pair of trapping site DC electrodes arranged in the first direction on the substrate may have the individually drivable respective one RF control electrode arranged between it. The at least one pair of trapping site DC electrodes arranged in the second direction on the substrate may have a second individually drivable respective one RF control electrode arranged between it. Typically, each pair of trapping site DC electrodes from the array of trapping site DC electrodes has an individually drivable RF control electrode arranged in between.

The method further includes applying DC voltages to the dedicated DC electrodes and RF voltages to the RF electrodes to generate a trapping potential for trapping the charged particles above the substrate. The DC voltages can be zero. The dedicated DC electrodes may be ground electrodes. Generally, DC voltages may be in the range from 0 Volts to ±40 Volts, e.g., from 0 to ±30 Volts. RF voltages from an RF voltage source, e.g., a function generator and an RF amplifier, may be in the range from 0 Volts to 25 Volts rms, typically from 0 Volts to 20 Volts rms, and may be variably applied in this range. The RF voltages from the voltage source may be less then 25 Volts rms, e.g. 20 Volts rms or less. Here, "rms" means "root mean square" as is common in electronics. For sinusoidal waveform, the relation $V_{rms}=V_p/Sqrt(2)$ holds, where $V_p$ is the peak voltage. The RF voltages may be increased by RF voltage drives, e.g., RF high-voltage resonators. Typically, the RF voltages applied to the RF electrodes when trapping ions are between 0 and 1000 Volts rms, typically between 0 and 500 Volts rms, e.g., less than 350 Volts rms at maximum and 0 Volts at minimum (shut off of control electrodes). The RF drive voltage may, e.g., be variable from 0 to about 250 Vrms. If the voltages are too high a spark may be caused even in vacuum and possibly damage or destroy the apparatus. Radio frequencies used to trap ions typically range from 5 MHz to 3 GHz, more typically from 10 MHz to 2 GHz, while typically keeping the drive voltage constant. However, if charged particles are trapped which are comparably large in comparison to ions, e.g., dust particles, and the charge-to-mass ratio is much smaller, the radio frequencies scale down accordingly. In this case, the radio frequencies range from 20 Hz to 10 kHz, typically from 40 Hz to 1 kHz, e.g., 50 Hz, although such frequency ranges are normally not called "radio frequencies". Here, the expression is justified by the upscaling and downscaling of the apparatus. Generally, RF voltage may refer to any AC voltage contributing to the trapping potential.

The method includes injecting or loading at least two charged particles into the trapping potential and trapping the at least two charged particles above the substrate. Typically, as many particles may be loaded as there are trapping site DC electrodes, or fewer particles may be loaded. This is typically the case for performing quantum interactions between ions. Alternatively, particles may be concentrated in the traps, and there may be many more charged particles in the apparatus than there are trapping site DC electrodes. This might e.g. be used in connection with the dust trapping apparatus. Loading the ions may include laser injecting the ions.

The RF voltage of the individually drivable respective one RF control electrode may be adjusted in order to take a first value such that the electric potential above and between the corresponding pair of trapping site DC electrodes forms separate charged particle traps. A first pair of two charged particles is trapped therein. Adjusting the RF voltage to take the first value may be part of applying the RF voltages to generate the trapping potential.

The method includes adjusting the RF voltage of the individually drivable respective one RF control electrode in order to take a second value such that the electric potential above and between the corresponding pair of trapping site DC electrodes forms a charged particle interaction trap. A controlled interaction or controlled interactions between the two charged particles are performed. Adjusting the RF voltage to take the first value may be part of applying the RF voltages to generate the trapping potential. The RF voltage of the individually drivable (first) respective one RF control electrode may be adjusted to take the first or another value after the controlled interaction is performed.

The method may include letting two particles interact that are arranged in the first dimension and letting two particles interact that are arranged in the second direction on the substrate. One of the two particles arranged in the first direction may also be one of the particles arranged in the second direction. Performing interactions between the particles in two dimensions, in particular quantum interactions between ions, is advantageous for the scalability of controllable quantum systems and hence the complexity of quantum algorithms that can be realized.

In particular, the method may include adjusting the RF voltage of the second individually drivable respective one RF control electrode in order to take a third value such that the electric potential above and between the corresponding pair of trapping site DC electrodes in the second direction forms separate charged particle traps. A second pair of two charged particles is trapped therein. One of the particles of the first pair may be identical to one of the particles of the second pair. The third value may be substantially identical to the first value.

The method may include adjusting the RF voltage of the second individually drivable respective one RF control electrode in order to take a fourth value such that the electric potential above and between the corresponding pair of trapping site DC electrodes in the second direction forms a charged particle interaction trap. A controlled interaction is performed between the two charged particles of the second pair. The fourth value may be substantially identical to the second value, and may, e.g., be zero. Adjusting the RF voltage of the second individually drivable respective one RF control electrode to take the fourth value may be carried out simultaneously with adjusting the RF voltage of the first individually drivable respective one RF control electrode to take the second value. In this way, either parallel interactions may be performed if the first and second pair include different particles, or cluster interactions between three particles may be performed if the first and the second pair include one common particle. The RF voltage of the individually drivable second respective one RF control electrode may be adjusted to take the third or another value after the controlled interaction is performed.

The method may further include locking the phase of the RF control voltages. The phases of the RF trapping may also be locked. The RF trapping voltages may be fixed voltages, and typically locking is not required. Locking the phase of RF voltages may include actively locking the phases to a reference phase. This may be done by means of a feedback loop, e.g., as describe with respect to FIG. 14 above. Alternatively, locking the phase may include balancing the RF drive connected to a respective one RF control electrode, e.g., as described with respect to FIG. 15. Phase locking can improve the trapping conditions and the control over the particles. A loss of a fixed phase relation may even lead to loss of particles out of the trap.

The method may further include applying additional individual DC voltages to the RF trapping and/or control electrodes. In this way the trapping potential and/or the interaction potential may be optimized. The DC voltages applied to the RF trapping and/or control electrodes are typically one or two orders of magnitude smaller than the applied RF voltages. Theses DC voltages may vary, e.g., during gate operation when potential barriers are lowered and raised by means of the RF control electrodes.

The method may further include at least one of the following: cooling the apparatus, providing a vacuum environment to the apparatus, cooling trapped ions, cooling trapped ions by laser interaction, reading out quantum state information, imaging quantum states of trapped ions by laser interaction, driving quantum state changes of trapped ions by laser interaction, and performing a quantum computation or quantum algorithm.

Embodiments are also directed to the use of the apparatus as described herein, typically to perform the method according to embodiments described herein. Further, the apparatus as described herein may be used as a mass spectrometer. The advantage of the multiple trapping sites provided by the apparatus and of the individual control over the RF control and/or trapping electrodes consists in the possibility to perform the mass spectrometry in parallel. Instead of sweeping through a whole frequency range and registering the ions ejected from the traps at certain frequencies, the apparatus of the present invention can drive separate traps over trapping site DC electrodes with different RF trapping frequencies applied to the neighboring RF electrodes. By registering ions ejected from the different traps, e.g., by means of several detectors, mass spectrometry is carried out in parallel. For mass spectroscopy applications the RF control electrodes may be used to sort ion species by weight without loss. The RF electrodes could be driven at different stability regimes, with the middle electrode set to be in between. In this way if one trapping site is loaded with a mixture of ions and then driven at the boundary of stability for one of the species, then they would tend to hop over the potential barrier generated by the control electrode and into the neighboring site. This would allow one to sort a mixture and still keep it for further analysis, for example by infrared or laser spectroscopy. In a further application, the shuttling ability of the apparatus between its traps may be used to carry out precise chemical reactions. As a simple example, Na+ and Cl– may be held in separate trapping sites and then the control electrode is used to bring them together in a carefully controlled way by varying the control voltage.

While the foregoing is directed to embodiments, other and further embodiments may be devised without departing from the basic scope determined by the claims that follow.

The invention claimed is:

1. An apparatus for trapping charged particles and performing controlled interactions between them, the apparatus comprising:
   a substrate; and
   RF electrodes and dedicated DC electrodes arranged on the substrate and configured to generate a trapping potential for trapping the charged particles in trapping sites above the substrate, the RF electrodes and dedicated DC electrodes including:
      at least one RF trapping electrode configured to be driven with an RF voltage for contributing to the trapping potential;
      an array of two or more trapping site DC electrodes configured to be biased with a DC voltage for contributing to the trapping potential; and
      a first individually drivable RF control electrode arranged between a first pair of the trapping site DC electrodes and configured to be individually driven by an adjustable RF voltage such that the trapping potential above and between the first pair of trapping site DC electrodes
         (a) forms separate charged particle traps adapted for trapping charged particles therein if the adjustable RF voltage takes a first value, and
         (b) forms a charged particle interaction trap adapted for performing controlled interactions between charged particles if the adjustable RF voltage takes a second value.

2. The apparatus according to claim 1, wherein the first RF control electrode is a single common RF middle electrode in between the first pair of trapping site DC electrodes.

3. The apparatus according to claim 1, wherein the array of trapping site DC electrodes is two-dimensional and includes the first pair of trapping site DC electrodes arranged in a first direction on the substrate and a second pair of trapping site DC electrodes arranged in a second direction on the substrate.

4. The apparatus according to claim 3, further comprising:
   a second individually drivable RF control electrode arranged between the second pair of the trapping site DC electrodes and configured to be individually driven by an adjustable RF voltage such that the trapping potential above and between the second pair of trapping site DC electrodes
      (c) forms separate charged particle traps adapted for trapping charged particles therein if the adjustable RF voltage takes a third value, and
      (d) forms a charged particle interaction trap adapted for performing controlled interactions between charged particles if the adjustable RF voltage takes a fourth value.

5. The apparatus according to claim 1, further comprising a first RF drive for individually driving the first RF control electrode.

6. The apparatus according to claim 4, further comprising a second RF drive for individually driving the second RF control electrode.

7. The apparatus according to claim 1, further comprising vias through the substrate for connecting a first RF drive to individually drive the first RF control electrode.

8. The apparatus according to claim 4, further comprising vias through the substrate for connecting a second RF drive to individually drive the second RF control electrode.

9. The apparatus according to claim 1, further comprising means configured to lock the phase of the RF voltages which are driving at least one of: the RF trapping and control electrodes.

10. The apparatus according to claim 9, wherein the means are configured to lock the phase by an active lock on a reference phase with feedback loop.

11. The apparatus according to claim 1, wherein the charged particles are ions and the apparatus is an on-chip surface-electrode ion trap apparatus.

12. The apparatus according to claim 11, configured for quantum computation or mass spectrometry.

13. The apparatus of claim 11, further comprising means for readout of information stored in the ions, wherein the means include, for readout of quantum state information, at least one of: one or more lasers and one or more detectors.

14. A system for trapping charged particles and performing controlled interactions between them, the system comprising:
   an apparatus for trapping charged particles and performing controlled interactions between them, the apparatus comprising:
      a substrate; and
      RF electrodes and dedicated DC electrodes arranged on the substrate and configured to generate a trapping potential for trapping the charged particles in trapping sites above the substrate, the RF electrodes and dedicated DC electrodes including:
         at least one RF trapping electrode configured to be driven with an RF voltage for contributing to the trapping potential;
         an array of two or more trapping site DC electrodes configured to be biased with a DC voltage for contributing to the trapping potential; and
         a first individually drivable RF control electrode arranged between a first pair of the trapping site DC electrodes and configured to be individually driven by an adjustable RF voltage such that the trapping potential above and between the first pair of trapping site DC electrodes
            (a) forms separate charged particle traps adapted for trapping charged particles therein if the adjustable RF voltage takes a first value, and
            (b) forms a charged particle interaction trap adapted for performing controlled interactions between charged particles if the adjustable RF voltage takes a second value;
   the system further comprising
      a cryostat for cooling the apparatus; and
      at least one element selected from the group consisting of: a vacuum chamber for providing a vacuum environment to the apparatus, one or more lasers for ionization of atoms, for loading ions into the apparatus, for addressing ions for quantum manipulation, for cooling ions and/or for imaging ions.

15. A method for trapping charged particles and performing controlled interactions between them, the method comprising:
   providing RF electrodes and dedicated DC electrodes arranged on a substrate and including:
      at least one RF trapping electrode, an array of two or more trapping site DC electrodes, and a first individually drivable RF control electrode arranged between a first pair of the trapping site DC electrodes;
   applying DC voltages to the dedicated DC electrodes and RF voltages to the RF electrodes to generate a trapping potential for trapping the charged particles above the substrate;
   adjusting the RF voltage of the first individually drivable RF control electrode in order to take a first value such that the electric potential above and between the first pair of trapping site DC electrodes forms separate charged particle traps, and trapping two charged particles therein; and
   adjusting the RF voltage of the first individually drivable RF control electrode in order to take a second value such that the electric potential above and between the first pair of trapping site DC electrodes forms a charged particle interaction trap, and performing a controlled interaction between the two charged particles.

16. The method of claim 10, wherein the array of trapping site DC electrodes is two-dimensional and includes the first pair of trapping site DC electrodes arranged in a first direction on the substrate, a second pair of trapping site DC electrodes arranged in a second direction on the substrate, and a second individually drivable RF control electrode arranged between the second pair of the trapping site DC electrodes, the method further comprising:
   adjusting the RF voltage of the second individually drivable RF control electrode in order to take a third value such that the electric potential above and between the second pair of trapping site DC electrodes in the second direction forms separate charged particle traps, and trapping two charged particles therein; and
   adjusting the RF voltage of the second individually drivable RF control electrode in order to take a fourth value such that the electric potential above and between the second pair of trapping site DC electrodes in the second direction forms a charged particle interaction trap, and performing a controlled interaction between the two charged particles.

17. The method according to claim 10, further comprising locking the phase of RF trapping and/or control voltages by actively locking the phases to a reference phase by a feedback loop.

18. The method according to claim 10, further comprising applying additional, individual, secondary DC voltages to at least on of: the RF trapping and control electrodes for optimizing the trapping potential or the interaction potential.

19. The method according to claim 10, wherein performing controlled interactions between the charged particles comprises performing a quantum gate operation.

20. The method according to claim 10, further comprising cooling the apparatus;
wherein the method further comprises at least one of the steps selected from the group consisting of: providing a vacuum environment to the apparatus, cooling trapped ions, cooling trapped ions by laser interaction, reading out quantum state information, imaging quantum states of trapped ions by laser interaction, driving quantum state changes of trapped ions by laser interaction, and performing a quantum computation.

* * * * *

UNITED STATES PATENT AND TRADEMARK OFFICE
CERTIFICATE OF CORRECTION

PATENT NO.        : 8,426,809 B2
APPLICATION NO.   : 13/107714
DATED             : April 23, 2013
INVENTOR(S)       : Kumph It is certified that error appears in the above-identified patent and that said Letters Patent is hereby corrected as shown below:

In the Specification:

Column 3, Line 32, please delete "an";

Column 15, Line 15, please delete "an" and insert --and-- therefor;

Column 17, Line 40, please delete "then" and insert --than-- therefor;

In the Claims:

Column 22, Claim 18, Line 44, please delete "on" and insert --one-- therefor.

Signed and Sealed this
Sixth Day of August, 2013

Teresa Stanek Rea
*Acting Director of the United States Patent and Trademark Office*